US012674007B2

(12) United States Patent (10) Patent No.: US 12,674,007 B2
Bae et al. (45) Date of Patent: Jul. 7, 2026

(54) PREPARATION METHOD FOR ETHYLENE-VINYL ALCOHOL COPOLYMER

(71) Applicant: LG Chem, Ltd., Seoul (KR)

(72) Inventors: Hyojin Bae, Daejeon (KR); Bongjune Kim, Daejeon (KR); Sungjin Song, Daejeon (KR); Se Won Baek, Daejeon (KR)

(73) Assignee: LG Chem, Ltd., Seoul (KR)

( * ) Notice: Subject to any disclaimer, the term of this patent is extended or adjusted under 35 U.S.C. 154(b) by 613 days.

(21) Appl. No.: 18/028,856

(22) PCT Filed: Jun. 30, 2022

(86) PCT No.: PCT/KR2022/009460
§ 371 (c)(1),
(2) Date: Mar. 28, 2023

(87) PCT Pub. No.: WO2023/080384
PCT Pub. Date: May 11, 2023

(65) Prior Publication Data
US 2024/0360252 A1 Oct. 31, 2024

(30) Foreign Application Priority Data

Nov. 2, 2021 (KR) ......................... 10-2021-0149099

(51) Int. Cl.
*C08F 8/12* (2006.01)

(52) U.S. Cl.
CPC ............ *C08F 8/12* (2013.01); *C08F 2810/50* (2013.01)

(58) Field of Classification Search
CPC ........ C08F 8/12; C08F 216/06; C08F 218/08; C08F 210/02
See application file for complete search history.

(56) References Cited

U.S. PATENT DOCUMENTS

| | | |
|---|---|---|
| 5,811,488 A | 9/1998 | Narumoto et al. |
| 2002/0032267 A1 | 3/2002 | Yanagida |
| 2002/0037971 A1 | 3/2002 | Kawahara et al. |
| 2003/0004279 A1 | 1/2003 | Kowaka et al. |
| 2003/0050410 A1 | 3/2003 | Kawahara et al. |
| 2005/0038163 A1 | 2/2005 | Shindome et al. |

| | | | |
|---|---|---|---|
| 2006/0258803 A1* | 11/2006 | Stark | .......................... C08J 3/14 |
| | | | 525/56 |
| 2020/0205146 A1 | 6/2020 | Takahashi et al. | |
| 2022/0153891 A1 | 5/2022 | Fukuhara et al. | |

FOREIGN PATENT DOCUMENTS

| | | |
|---|---|---|
| CN | 1055366 A | 10/1991 |
| CN | 1277215 A | 12/2000 |
| CN | 1341671 A | 3/2002 |
| CN | 1832983 A | 9/2006 |
| CN | 109651557 A | 4/2019 |
| EP | 1279683 B1 | 8/2005 |
| JP | S4738558 B | 9/1972 |
| JP | H09067411 A | 3/1997 |
| JP | 2000169652 A | 6/2000 |
| JP | 2001055414 A | 2/2001 |
| JP | 3429810 B2 | 7/2003 |
| JP | 2006526050 A | 11/2006 |
| JP | 4046245 B2 | 2/2008 |
| JP | 4077318 B2 | 4/2008 |
| JP | 5281071 B2 | 9/2013 |
| KR | 100236896 B1 | 1/2000 |
| KR | 20010007301 A | 1/2001 |
| KR | 100591675 B1 | 6/2006 |
| KR | 20080040326 A | 5/2008 |
| KR | 20080043454 A | 5/2008 |
| KR | 101132963 B1 | 4/2012 |
| KR | 101906689 B1 | 10/2018 |
| KR | 20200003169 A | 1/2020 |
| WO | 02050137 A1 | 6/2002 |
| WO | 2015045982 A1 | 4/2015 |
| WO | 2020213554 A1 | 10/2020 |
| WO | 2023121379 A1 | 6/2023 |

OTHER PUBLICATIONS

International Search Report for PCT/KR2022/009460 mailed Sep. 30, 2022. 3 pages. (see pp. 2, categorizing the cited references.).
Extended European Search Report including Written Opinion for Application No. 22871051.3 dated Mar. 21, 2024, pp. 1-8.

* cited by examiner

*Primary Examiner* — Robert C Boyle
(74) *Attorney, Agent, or Firm* — Lerner David LLP

(57) ABSTRACT

A method for preparing ethylene-vinyl alcohol copolymer capable of obtaining ethylene-vinyl alcohol copolymer of high saponification degree, while minimizing the amount of alkali catalysts used is disclosed herein. The method comprises adding a first alkali catalyst solution dropwise to ethylene-vinyl acetate copolymer dispersed in an alcohol solvent, and adding a second alkali catalyst solution dropwise to the first saponification reaction mixture.

15 Claims, No Drawings

PREPARATION METHOD FOR ETHYLENE-VINYL ALCOHOL COPOLYMER

CROSS-REFERENCE TO RELATED APPLICATION(S)

This application is a national stage entry under 35 U.S.C. § 371 of International Application No. PCT/KR2022/009460 filed on Jun. 30, 2022, which claims priority from Korean Patent Application No. 10-2021-0149099 filed on Nov. 2, 2021, all the disclosures of which are herein incorporated by reference.

TECHNICAL FIELD

This invention relates to a method for preparing ethylene-vinyl alcohol copolymer.

BACKGROUND ART

Since ethylene-vinyl alcohol copolymer (EVOH) has excellent barrier property for gas such as oxygen, transparency, oil resistance, non-charging property, mechanical strength, and the like, it is being widely used as materials of films, sheets, containers, and the like.

The EVOH may be prepared by a saponification reaction of ethylene-vinyl acetate copolymer (EVAc) prepared by copolymerization of ethylene and vinyl acetate. As catalysts of the saponification reaction of EVAc, alkali catalysts such as sodium hydroxide, potassium hydroxide, alkali metal alcoholate, and the like are mainly used.

Since EVOH having higher saponification degree exhibits more excellent gas barrier property, it is preferable that EVOH used for food packaging, and the like has a high saponification degree of 99% or more. In order to achieve such a high saponification degree, previously, the saponification reaction was conducted at higher temperature, or the amount of alkali catalysts used was increased.

However, in the case of high temperature saponification reaction, side reactions may easily occur, and in case a large quantity of alkali catalysts are used, the amount of catalyst by-products may increase in the saponification product. Since the catalyst by-products cause discoloration of EVOH, a cleaning process for removing the same is involved after a saponification reaction, but if the content of catalyst by-products is high, excessive cleaning process is required, thus deteriorating process efficiency, and excess waste water is generated, which is not preferable in terms of environment.

DETAILED DESCRIPTION OF THE INVENTION

Technical Problem

In order to solve the problem, it is an object of the invention to provide a method for preparing ethylene-vinyl alcohol copolymer capable of obtaining ethylene-vinyl alcohol copolymer of high saponification degree, while minimizing the amount of alkali catalysts used.

Technical Solution

According to one embodiment of the invention, there is provided a method for preparing ethylene-vinyl alcohol copolymer comprising:

a first saponification reaction step wherein while adding a first alkali catalyst solution dropwise to ethylene-vinyl acetate copolymer dispersed in an alcohol solvent, they were reacted; and a second saponification reaction step wherein while adding a second alkali catalyst solution dropwise to the first saponification reaction mixture, they were reacted.

Effect of the Invention

According to the invention, ethylene-vinyl alcohol copolymer of high saponification degree can be obtained, while minimizing the amount of alkali catalysts used. Thus, according to the invention, the efficiency of a cleaning process for removing catalyst by-products contained in ethylene-vinyl alcohol copolymer after a saponification process may be increased, and the amount of waste water generated during the cleaning process may be minimized.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, the invention will be explained in detail.

The method for preparing ethylene-vinyl alcohol copolymer of the invention comprises:

a first saponification reaction step wherein while adding a first alkali catalyst solution dropwise to ethylene-vinyl acetate copolymer dispersed in an alcohol solvent, they were reacted; and a second saponification reaction step wherein while adding a second alkali catalyst solution dropwise to the first saponification reaction mixture, they were reacted.

According to the invention, the saponification reaction of ethylene-vinyl acetate copolymer (EVAc) is divided and progressed in two steps, and alkali catalyst solutions are not introduced at once, but continuously added dropwise in each step. Wherein, 'add dropwise' means drip introduction of a solution.

As such, if the alkali catalyst solution is continuously added dropwise, compared to the case of introducing the catalysts at once, ethylene-vinyl alcohol copolymer of high saponification degree can be obtained even with a small amount of catalysts, and thus, a cleaning process for removing alkali catalyst by-products included in prepared ethylene-vinyl alcohol copolymer after the saponification reaction may be simplified, thereby increasing process efficiency and economical feasibility, and minimizing the amount of waste water generation.

According to the invention, as the reactant ethylene-vinyl acetate copolymer, commercially available products may be used, or it may be prepared by copolymerization of ethylene and vinyl acetate monomers.

And, the ethylene-vinyl acetate copolymer may be those copolymerized from ethylene and vinyl acetate, and besides, from monomers copolymerizable therewith. As the examples of such monomers, α-olefin such as propylene, isobutylene, a-octene, a-dodecene, and the like; unsaturated acid such as acrylic acid, methacrylic acid, crotonic acid, maleic acid, itaconic acid, and the like, and salts, anhydrides, mono-or dialkylester thereof; nitriles such as acrylonitrile, methcrylonitrile, and the like; amides such as acrylamide, methacrylamide, and the like; olefin sulfonic acid such as ethylene sulfonic acid, methallyl sulfonic acid, and the like, or salts thereof; vinyl-based monomers such as alkylvinyl ethers, vinylketone, N-vinylpyrrolidone, vinyl chloride, vinylidene chloride, and the like, may be mentioned.

The ethylene content of the ethylene-vinyl acetate copolymer may be appropriately controlled according to the aimed properties of the ethylene-vinyl alcohol copolymer. According to one embodiment, the ethylene content of the ethylene-vinyl acetate copolymer may be 20 mol % or more, 25mol % or more, 27 mol %, or 30 mol % or more, and 60 mol % or less, 50 mol % or less, 48 mol %, or 35 mol % or less. If the ethylene content of the ethylene-vinyl acetate copolymer is too low, melt forming property and gas barrier property under high humidity of prepared ethylene-vinyl alcohol copolymer may be deteriorated, and if it is too high, gas barrier property may be deteriorated. Meanwhile, the ethylene content may be calculated from integral number ratio of peaks in $^1$H-NMR data of ethylene-vinyl acetate copolymer, or ethylene-vinyl alcohol copolymer, as described in Examples later.

The weight average molecular weight (Mw) of the ethylene-vinyl acetate copolymer is not specifically limited, but for example, it may be 180,000 g/mol or more, 200,000 g/mol or more, or 220,000 g/mol or more, and 290,000 g/mol or less, 270,000 g/mol or less, or 260,000 g/mol or less. Ethylene-vinyl alcohol copolymer obtained by the saponification reaction of ethylene-vinyl acetate copolymer fulfilling such weight average molecular weight may have weight average molecular weight in the range of 120,000 g/mol or more, 130,000 g/mol or more, or 140,000 g/mol or more, and 180,000 g/mol or less, 170,000 g/mol or less, or 160,000 g/mol or less.

If the weight average molecular weight of the ethylene-vinyl acetate copolymer is too large, the viscosity of prepared ethylene-vinyl alcohol copolymer may become too high, thus making melt extrusion difficult, and if it is too small, film forming property may become unstable when preparing a film. The weight average molecular weights of the ethylene-vinyl acetate copolymer and ethylene-vinyl alcohol copolymer may be measured through gel permeation chromatograph (GPC), as described later.

As the alcohol solvent, solvents commonly used in the saponification reaction of ethylene-vinyl acetate copolymer may be used. For example, as the alcohol solvent, lower alcohol solvents such as methanol, ethanol, propanol, isopropanol, or butanol, and the like may be used, and among them, methanol is industrially preferable because the acquisition is easy and the cost is low.

As the first alkali catalyst and second alkali catalyst, one or more selected from the group consisting of sodium hydroxide, potassium hydroxide, lithium hydroxide, sodium methoxide, sodium ethoxide, potassium t-butoxide, sodium carbonate, sodium hydrogen carbonate, potassium carbonate, potassium hydrogen carbonate, sodium acetate, potassium acetate, and sodium propionate may be used, and for the preparation of EVOH of high saponification degree, sodium hydroxide, potassium hydroxide, sodium methoxide or sodium ethoxide may be preferably used.

The first alkali catalyst and the second alkali catalyst may be identical to or different from each other, and preferably, as the first alkali catalyst and the second alkali catalyst, identical materials may be used.

The total amount of the first alkali catalyst and second alkali catalyst used may be 0.01 moles or more, or 0.015 moles or more, and less than 0.03 moles, or 0.02 moles or less, based on 1 mole of the vinyl acetate unit of ethylene-vinyl acetate copolymer.

Previously, in order to prepare ethylene-vinyl alcohol copolymer having high saponification degree, based on 1 mole of vinyl acetate unit, 0.03 moles or more of alcohol was required, but according to the preparation method of the invention, ethylene-vinyl alcohol copolymer having high saponification degree can be prepared while minimizing the amount of alcohol catalysts used. However, if the total amount of the alkali catalyst used is less than 0.01 moles, a saponification reaction may become excessively slow, and thus, it is preferable to meet the above catalyst amount.

And, within a range fulfilling the total amount used, the first alkali catalyst and second alkali catalyst may be used respectively in an amount of 0.0025 moles or more, or 0.005 moles or more, and 0.02 moles or less, or 0.01 moles or less, based on 1 mole of the vinyl acetate unit of ethylene-vinyl acetate copolymer.

The first alkali catalyst and second alkali catalyst may be used at a mole ratio of 1:1 to 1:4, or 1:1 to 1:2. As such, by controlling the amount of the second alkali catalyst used to be equal to or larger than the amount of the first alkali catalyst used, ethylene-vinyl alcohol copolymer having high saponification degree can be prepared.

The first alkali catalyst and second alkali catalyst are added dropwise to the ethylene-vinyl acetate copolymer in the form of solutions. Wherein, as the solvent, the above explained alcohol solvents may be used, and it is preferable to use the same solvent as used in the preparation of the ethylene-vinyl acetate copolymer dispersion. The concentrations of the alkali catalyst solutions may be identical to or different from each other, and may be controlled according to the concentration of the ethylene-vinyl acetate copolymer dispersion and aimed dropwise addition speed of the alkali catalyst solution.

In the first saponification reaction step, ethylene-vinyl acetate copolymer is first dispersed in an alcohol solvent to prepare a dispersion, and while adding the first alkali catalyst dropwise thereto, a saponification reaction is progressed.

The amount of the alcohol solvent used for preparing the ethylene-vinyl acetate copolymer dispersion may be appropriately controlled according to the kind of the alcohol solvent, the kind of ethylene-vinyl acetate copolymer, and the concentration of the alkali catalyst solution, and the like. For example, the alcohol solvent may be used in the range of 100 parts by weight to 1000 parts by weight, or 200 parts by weight or more, or 300 parts by weight or more, and 800 parts by weight, or 700 parts by weight, or 500 parts by weight or less, based on 100 parts by weight of ethylene-vinyl acetate copolymer, but the amount is not limited thereto.

The dropwise addition speed of the first alkali catalyst solution may be controlled according to reaction time, and for example, the dropwise addition of the first alkali catalyst may be conducted such that the introduction amount of the first alkali catalyst per minute becomes $1.0*10^{-5}$ moles to $13*10^{-5}$ moles, based on 1 mole of the vinyl acetate unit of ethylene-vinyl acetate copolymer. When the dropwise addition speed range is met, a saponification reaction time may not be excessively lengthened, but reaction efficiency may be increased, thus preparing ethylene-vinyl alcohol copolymer having high saponification degree.

In this respect, the dropwise addition of the first alkali catalyst solution is preferably conducted such that the introduction amount of the first alkali catalyst per minute becomes $2.0*10^{-5}$ moles or more, or $3.0*10^{-5}$ moles or more, or $4.0*10^{-5}$ moles or more, and $11.0*10^{-5}$ moles or less, or $10.0*10^{-5}$ moles or less, or $9.0*10^{-5}$ moles or less, based on 1 mole of the vinyl acetate unit of ethylene-vinyl acetate copolymer.

The temperature of the first saponification reaction step may be 40° C. or more, 50° C. or more, or 60° C. or more, and 120° C. or less, 110° C. or less, or 100° C. or less. If the reaction temperature is less than 40° C., saponification reaction speed may become excessively slow, and if it is greater than 120° C., side reactions may easily occur, and thus, it is preferable to meet the above range.

The first saponification reaction may be conducted under inert gas atmosphere, and in order to increase conversion rate, the reaction may be progressed while continuously discharging methyl acetate by-products outside the system.

Meanwhile, the completion of the first saponification reaction step may be achieved when the dropwise addition of the first alkali solution is completed. That is, the dropwise addition of the first alkali solution may be continuously conducted from the beginning to the end of the first saponification reaction. As such, by adding the first alkali solution dropwise over the reaction time, conversion rate of EVAc to EVOH may be increased while minimizing side reactions.

After the first saponification reaction is completed, a second alkali catalyst solution separately prepared is added dropwise to the reaction mixture, to conduct a second saponification reaction.

The first saponification reaction step and the second saponification reaction step may be continuously conducted. That is, immediately after the completion of the first saponification reaction step, a second alkali catalyst solution may be added dropwise to the reaction mixture, thus progressing a second saponification reaction.

The dropwise addition speed of the second alkali catalyst solution may be controlled according to reaction time, and for example, the dropwise addition of the second alkali catalyst may be conducted such that the introduction amount of the second alkali catalyst per minute becomes $2.0*10^{-5}$ moles to $8.0*10^{-5}$ moles, based on 1 mole of the vinyl acetate unit of ethylene-vinyl acetate copolymer. When the dropwise addition speed range is met, a saponification reaction time may not be excessively lengthened, but reaction efficiency may be increased, thus preparing ethylene-vinyl alcohol copolymer having high saponification degree.

In this respect, the dropwise addition of the second alkali catalyst solution is preferably conducted such that the introduction amount of the second alkali catalyst per minute becomes $2.0*10^{-5}$ moles or more, or $3.0*10^{-5}$ moles or more, or $4.0*10^{-5}$ moles or more, and $7.0*10^{-5}$ moles or less, $6.0*10^{-5}$ moles or less, based on 1 mole of the vinyl acetate unit of ethylene-vinyl acetate copolymer.

The temperature of the second saponification reaction step may be 60° C. or more, 70° C. or more, or 80° C. or more, and 120° C. or less, 110° C. or less, or 100° C. or less. If the reaction temperature is less than 60° C., saponification reaction speed may become excessively slow, and if it is greater than 120° C., side reactions may easily occur.

Meanwhile, as long as the above range is met, the temperature of the second saponification reaction step may be equal to or higher than the temperature of the first saponification reaction step. In this case, reaction efficiency may increase, and thus, ethylene-vinyl alcohol copolymer having high saponification degree can be obtained.

The second saponification reaction may be conducted under inert gas atmosphere, and in order to increase conversion rate, the reaction may be progressed while continuously discharging methyl acetate by-products outside the system.

Like the first saponification reaction step, the completion of the second saponification reaction step may be achieved when the dropwise addition of the second alkali solution is completed. That is, the dropwise addition of the second alkali solution may be continuously conducted from the beginning to the end of the second saponification reaction. As such, by adding the second alkali solution dropwise over the reaction time, conversion rate of EVAc to EVOH may be increased while minimizing side reactions.

According to the above preparation method, ethylene-vinyl alcohol copolymer having high saponification degree of 99% or more can be obtained using small amount of alkali catalysts, compared to the existing batch type saponification process of ethylene-vinyl acetate copolymer. Since the ethylene-vinyl alcohol copolymer has high saponification degree and thus exhibits excellent gas barrier property, it may be usefully used for food packaging, and the like.

For example, the ethylene-vinyl alcohol copolymer prepared according to the preparation method may have a saponification degree of 99% or more, or 99% to 99.9%; an ethylene content of 20 mol % or more, 25mol % or more, 27 mol % or more, or 30 mol % or more, and 60 mol % or less, 50 mol % or less, 48 mol % or less, or 35 mol % or less; and weight average molecular weight of 120,000 g/mol or more, 130,000 g/mol or more, or 140,000 g/mol or more, and 180,000 g/mol or less, 170,000 g/mol or less, or 160,000 g/mol or less. Such ethylene-vinyl alcohol copolymer may exhibit excellent formability and gas barrier property.

Hereinafter, preferable examples will be presented for better understanding of the invention, but these examples are presented only as the illustrations of the invention, and it is obvious to a person having ordinary knowledge in the art that various modifications and alterations can be made within the range of the categories and technical ideas of the invention, and that such alterations and modifications are within the claims attached.

EXAMPLES

Example 1

100 parts by weight of ethylene-vinyl acetate copolymer (EVAc, Mw $238*10^3$ g/mol) having an ethylene content of 32 mol %, and 400 parts by weight of methanol were put in a saponification reactor, and while continuously adding 20 parts by weight of a methanol solution of sodium hydroxide (16 g/L) (sodium hydroxide/vinyl acetate unit=0.01/1, mole ratio) dropwise to the saponification reactor for 2 hours, a first saponification reaction was progressed. Wherein, the dropwise addition speed was controlled such that the mole number of sodium hydroxide introduced per vinyl acetate unit of EVAc became $8.3*10^{-5}$ moles per minute. While continuously introducing a methanol solution of sodium hydroxide in the reactor as described above, nitrogen gas was injected in the reactor, and the reaction was progressed at 60° C. for 2 hours while removing methyl acetate by-product together with together methanol outside the system.

And, while continuously adding 20 parts by weight of a separately prepared methanol solution of sodium hydroxide (16 g/L) (sodium hydroxide/vinyl acetate unit=0.01/1, mole ratio) dropwise to the saponification reactor for 3 hours, a second saponification reaction was progressed. Wherein, the dropwise addition speed was controlled such that the mole number of sodium hydroxide introduced per vinyl acetate unit of EVAc became $5.6*10^{-5}$ moles per minute. While continuously introducing a methanol solution of sodium hydroxide in the reactor as described above, nitrogen gas was injected in the reactor, and the reaction was progressed at 100° C. for 3 hours while removing methyl acetate by-product together with methanol outside the system.

And then, the reaction mixture was neutralized with 120 parts by weight of an acetic acid aqueous solution (9 g/L) (acetic acid/sodium hydroxide=1/1, mole ratio) to stop the reaction, thus obtaining an EVOH methanol/water solution consisting of 60 parts by weight of ethylene-vinyl alcohol copolymer (EVOH), 120 parts by weight of methanol and 120 parts by weight of water. The EVOH solution was cooled to a room temperature to coagulate. And then, it was washed by repeatedly conducting the operations of draining with a centrifuge, adding water, and then, draining again. And, it was dried under 80° C. vacuum for 16 hours to prepare EVOH having a moisture content of 0.01 mass %.

Example 2

100 parts by weight of ethylene-vinyl acetate copolymer (EVAc, Mw $242*10^3$ g/mol) having an ethylene content of 32 mol %, and 400 parts by weight of methanol were put in a saponification reactor, and while continuously adding 10 parts by weight of a methanol solution of sodium hydroxide (16 g/L) (sodium hydroxide/vinyl acetate unit=0.005/1, mole ratio) dropwise to the saponification reactor for 2 hours, a first saponification reaction was progressed. Wherein, the dropwise addition speed was controlled such that the mole number of sodium hydroxide introduced per vinyl acetate unit of EVAc became $4.2*10^{-5}$ moles per minute. While continuously introducing a methanol solution of sodium hydroxide in the reactor as described above, nitrogen gas was injected in the reactor, and the reaction was progressed at 100° C. for 2 hours while removing methyl acetate by-product together with together methanol outside the system.

And, while continuously adding 20 parts by weight of a methanol solution of sodium hydroxide (16 g/L) (sodium hydroxide/vinyl acetate unit=0.01/1, mole ratio) dropwise to the saponification reactor for 3 hours, a second saponification reaction was progressed. Wherein, the dropwise addition speed was controlled such that the mole number of sodium hydroxide introduced per vinyl acetate unit of EVAc became $5.6*10^{-5}$ moles per minute. While continuously introducing a methanol solution of sodium hydroxide in the reactor as described above, nitrogen gas was injected in the reactor, and the reaction was progressed at 100° C. for 3 hours while removing methyl acetate by-product together with methanol outside the system.

And then, the reaction mixture was neutralized with 120 parts by weight of an acetic acid aqueous solution (9 g/L) (acetic acid/sodium hydroxide=1/1, mole ratio) to stop the reaction, thus obtaining an EVOH methanol/water solution consisting of 60 parts by weight of EVOH, 120 parts by weight of methanol and 120 parts by weight of water. And then, EVOH was obtained from the EVOH solution through the same process as Example 1.

Comparative Example 1

100 parts by weight of ethylene-vinyl acetate copolymer (EVAc, Mw $241*10^3$ g/mol) having an ethylene content of 32 mol %, and 400 parts by weight of methanol were put in a saponification reactor, and 40 parts by weight of a methanol solution of sodium hydroxide (16 g/L) (sodium hydroxide/vinyl acetate unit=0.02/1, mole ratio) was introduced in the saponification reactor at a time. Nitrogen gas was injected in the reactor, and the reaction was progressed at 100° C. for 5 hours while removing methyl acetate by-product together with together methanol outside the system. And then, the reaction mixture was neutralized with 120 parts by weight of an acetic acid aqueous solution (9 g/L) (acetic acid/sodium hydroxide=1/1, mole ratio) to stop the reaction, thus obtaining an EVOH methanol/water solution consisting of 60 parts by weight of EVOH, 120 parts by weight of methanol and 120 parts by weight of water. And then, EVOH was obtained from the EVOH solution through the same process as Example 1.

Comparative Example 2

100 parts by weight of ethylene-vinyl acetate copolymer (Mw $236*10^3$ g/mol) having an ethylene content of 32 mol %, and 400 parts by weight of methanol were put in a saponification reactor, and 40 parts by weight of a methanol solution of sodium hydroxide (16 g/L) (sodium hydroxide/vinyl acetate unit=0.02/1, mole ratio) was introduced in the saponification reactor at a time. Nitrogen gas was injected in the reactor, and the reaction was progressed at 100° C. for 8 hours while removing methyl acetate by-product together with together methanol outside the system. And then, the reaction mixture was neutralized with 120 parts by weight of an acetic acid aqueous solution (9 g/L) (acetic acid/sodium hydroxide=1/1, mole ratio) to stop the reaction, thus obtaining an EVOH methanol/water solution consisting of 60 parts by weight of EVOH, 120 parts by weight of methanol and 120 parts by weight of water. And then, EVOH was obtained from the EVOH solution through the same process as Example 1.

Comparative Example 3

100 parts by weight of ethylene-vinyl acetate copolymer (Mw $237*10^3$ g/mol) having an ethylene content of 32 mol %, and 400 parts by weight of methanol were put in a saponification reactor, and 60 parts by weight of a methanol solution of sodium hydroxide (16 g/L) (sodium hydroxide/vinyl acetate unit=0.03/1, mole ratio) was introduced in the saponification reactor at a time. Nitrogen gas was injected in the reactor, and the reaction was progressed at 100° C. for 5 hours while removing methyl acetate by-product together with together methanol outside the system. And then, the reaction mixture was neutralized with 120 parts by weight of an acetic acid aqueous solution (9 g/L) (acetic acid/sodium hydroxide=1/1, mole ratio) to stop the reaction, thus obtaining an EVOH methanol/water solution consisting of 60 parts by weight of EVOH, 120 parts by weight of methanol and 120 parts by weight of water. And then, EVOH was obtained from the EVOH solution through the same process as Example 1, but due to high content of catalyst impurities, a washing process were further repeated several times, and thus, waste water of the washing process increased 50% compared to Example 1.

Comparative Example 4

100 parts by weight of ethylene-vinyl acetate copolymer (Mw 238*10$^3$ g/mol) having an ethylene content of 32 mol %, and 400 parts by weight of methanol were put in a saponification reactor, and 20 parts by weight of a methanol solution of sodium hydroxide (16 g/L) (sodium hydroxide/vinyl acetate unit=0.01/1, mole ratio) was introduced in the saponification reactor at a time. Nitrogen gas was injected in the reactor, and the reaction was progressed at 60° C. for 2 hours while removing methyl acetate by-product together with together methanol outside the system.

And then, 20 parts by weight of a methanol solution of sodium hydroxide (16 g/L) (sodium hydroxide/vinyl acetate unit=0.01/1, mole ratio) was introduced in the saponification reactor at a time. Nitrogen gas was injected in the reactor, and the reaction was progressed at 100° C. for 3 hours while removing methyl acetate by-product together with together methanol outside the system. And then, the reaction mixture was neutralized with 120 parts by weight of an acetic acid aqueous solution (9 g/L) (acetic acid/sodium hydroxide=1/1, mole ratio) to stop the reaction, thus obtaining an EVOH methanol/water solution consisting of 60 parts by weight of EVOH, 120 parts by weight of methanol and 120 parts by weight of water. And then, EVOH was obtained from the EVOH solution through the same process as Example 1.

Experiment conditions of the Examples and Comparative Examples were summarized in the following Table 1.

TABLE 1

| | Catalyst addition method | Total amount of catalysts used in reaction/vinyl acetate unit (mole ratio) | Reaction temperature (first/second) | Reaction time |
|---|---|---|---|---|
| Example 1 | Continuous dropwise addition | 0.02/1 | 60° C./ 100° C. | 5 hours |
| Example 2 | Continuous dropwise addition | 0.015/1 | 100° C./ 100° C. | 5 hours |
| Comparative Example 1 | Simultaneous introduction | 0.02/1 | 100° C. | 5 hours |
| Comparative Example 2 | Simultaneous introduction | 0.02/1 | 100° C. | 8 hours |
| Comparative Example 3 | Simultaneous introduction | 0.03/1 | 100° C. | 5 hours |
| Comparative Example 4 | Divided introduction | 0.02/1 | 60° C./ 100° C. | 5 hours |

EXPERIMENTAL EXAMPLE (1) Ethylene Content of Ethylene-Vinyl Acetate Copolymer The ethylene contents of the ethylene-vinyl acetate copolymers used in Examples 1 to 2 and Comparative Examples 1 to 3 were calculated through integral ratio from $^1$H-NMR data.

Specifically, integral value of —COOCH— peak (δ 4.78) derived from vinyl acetate units in $^1$H-NMR was obtained, and from the integral value of δ 0.74-2.10 peak, integral value of —CH$_2$— peaks derived from ethylene units was obtained, and the percentage of ethylene units to the sum of vinyl acetate units and ethylene units were calculated, thus obtaining the ethylene content of ethylene-vinyl acetate copolymer.

(2) Saponification Degree

Through the integral ratio of peaks in $^1$H-NMR data of EVOH, saponification degree of prepared EVOH was calculated.

Specifically, the integral value of —OH peak (δ 4.05-4.72) derived from vinyl alcohol units data and the integral value of —CH$_3$COO— peak (δ 1.99) derived from vinyl acetate units of $^1$H-NMR data were obtained, and the percentage of vinyl alcohol units to the sum of vinyl alcohol units and vinyl acetate units was calculated, thus obtaining a saponification degree.

(3) Measurement of Molecular Weight

For each EVOH prepared in Examples 1~2 and Comparative Examples 1~3, molecular weight was measured after GPC sampling (2.0 mg/mL in DMSO). GPC analysis conditions were as follows.

<Analysis Conditions>

Column: PLgel Mixed B X 2

Solvent: DMF (with 0.05 M LiBr)

Flow rate: 1.0 mL/min

Sample injection amount: 100 uL

Column temperature: 65° C.

Detector: Waters 2414 RID

Date processing: Empower 2

TABLE 2

| | Ethylene content of EVAc(mol %) | Catalyst addition method | Saponi- fication degree | Weight average molecular weight (g/mol) |
|---|---|---|---|---|
| Example 1 | 32 | Continuous dropwise addition | 99.80% | 152,000 |
| Example2 | 32 | Continuous dropwise addition | 99.80% | 154,000 |
| Comparative Example 1 | 32 | Simultaneous introduction | 96.40% | 154,000 |
| Comparative Example 2 | 32 | Simultaneous introduction | 96.60% | 151,000 |
| Comparative Example 3 | 32 | Simultaneous introduction | 99.60% | 151,000 |
| Comparative Example 4 | 32 | Divided introduction | 98.50% | 152,000 |

As the result of experiments, it can be confirmed that in the case of Examples 1 and 2 wherein sodium hydroxide catalysts were continuously added dropwise and introduced throughout the reaction time in the batch type saponification process, a saponification degree of EVOH was 99.0 mol % or more, and thus, Examples 1 and 2 exhibited higher saponification degrees, compared to Comparative Examples 1 and 2 wherein the catalysts were introduced at a time, and Comparative Example 4 wherein the catalyst was dividedly introduced two times. And, Examples 1 and 2 also exhibited improved saponification degree, compared to Comparative Example 3 wherein the amount of the catalyst used was higher.

From the results, it can be confirmed that according to the preparation method of the invention, EVOH having high saponification degree can be prepared while minimizing the amount of alkali catalysts used.

The invention claimed is:

1. A method for preparing ethylene-vinyl alcohol copolymer, comprising:

a first saponification reaction step wherein a first saponification reaction is performed while adding a first alkali catalyst solution dropwise to ethylene-vinyl acetate copolymer dispersed in an alcohol solvent, and a first saponification reaction mixture is obtained after the first saponification reaction step is completed; and a second saponification reaction step wherein a second saponification reaction is performed while adding a second alkali catalyst solution dropwise to the first saponification reaction mixture, wherein a total amount of the first alkali catalyst and second alkali catalyst used are 0.01 moles or more to less than 0.03 moles, based on 1 mole of vinyl acetate unit of the ethylene-vinyl acetate copolymer, the first saponification reaction step is completed when the dropwise addition of the first alkali catalyst solution is completed, and the second saponification reaction step is completed when the dropwise addition of the second alkali catalyst solution is completed.

2. The method according to claim 1, wherein the first alkali catalyst and second alkali catalyst are used respectively in an amount of 0.0025 moles to 0.02 moles, based on 1 mole of vinyl acetate unit of the ethylene-vinyl acetate copolymer.

3. The method according to claim 1, wherein the dropwise addition of the first alkali catalyst solution is conducted so that an introduction amount of the first alkali catalyst per minute is $1.0*10^{-5}$ moles to $13*10^{-5}$ moles, based on 1 mole of vinyl acetate unit of the ethylene-vinyl acetate copolymer.

4. The method according to claim 1, wherein the dropwise addition of the second alkali catalyst solution is conducted so that an introduction amount of the second alkali catalyst per minute is $2.0*10^{-5}$ moles to $8.0*10^{-5}$ moles, based on 1 mole of vinyl acetate unit of the ethylene-vinyl acetate copolymer.

5. The method according to claim 1, wherein the first saponification reaction step and the second saponification reaction step are continuously conducted.

6. The method according to claim 1, wherein the second saponification reaction step is conducted at a temperature equal to or higher than a temperature at which the first saponification reaction step is conducted.

7. The method according to claim 1, wherein the first saponification reaction step is conducted at a temperature of 40° C. to 120° C.

8. The method according to claim 1, wherein the second saponification reaction step is conducted at a temperature of 60° C. to 120° C.

9. The method according to claim 1, wherein ethylene content of the ethylene-vinyl acetate copolymer is 20 mol % or more, and 60 mol % or less.

10. The method according to claim 1, wherein the ethylene-vinyl acetate copolymer has a weight average molecular weight (Mw) of 180,000 g/mol or more, and 290,000 g/mol or less.

11. The method according to claim 1, wherein the first alkali catalyst and second alkali catalyst are identical to or different from each other, and each independently at least one selected from sodium hydroxide, potassium hydroxide, lithium hydroxide, sodium methoxide, sodium ethoxide, potassium t-butoxide, sodium carbonate, sodium hydrogen carbonate, potassium carbonate, potassium hydrogen carbonate, sodium acetate, potassium acetate, or sodium propionate.

12. The method according to claim 1, wherein the first alkali catalyst and second alkali catalyst are used at a mole ratio of 1:1 to 1:4.

13. The method according to claim 1, wherein the alcohol solvent is methanol, ethanol, propanol, isopropanol, or butanol.

14. The method according to claim 1, wherein the alcohol solvent is used in an amount of 100 parts by weight to 1000 parts by weight, based on 100 parts by weight of the ethylene-vinyl acetate copolymer.

15. The method according to claim 1, wherein the ethylene-vinyl alcohol copolymer has a saponification degree of 99% or more.

* * * * *